(12) United States Patent
McLoughlin

(10) Patent No.: US 10,216,215 B1
(45) Date of Patent: Feb. 26, 2019

(54) SAFETY COVER FOR AUTOMOTIVE BRAKE PEDAL

(71) Applicant: John E. McLoughlin, Hauppauge, NY (US)

(72) Inventor: John E. McLoughlin, Hauppauge, NY (US)

( * ) Notice: Subject to any disclaimer, the term of this patent is extended or adjusted under 35 U.S.C. 154(b) by 0 days.

(21) Appl. No.: 15/890,093

(22) Filed: Feb. 6, 2018

(51) Int. Cl.
*G05G 1/48* (2008.04)
*G05G 1/483* (2008.04)
*G05G 1/487* (2008.04)
*B60T 7/06* (2006.01)

(52) U.S. Cl.
CPC ............. *G05G 1/483* (2013.01); *G05G 1/487* (2013.01); *B60T 7/06* (2013.01)

(58) Field of Classification Search
CPC .......... G05G 1/48; G05G 1/483; G05G 1/487; B60T 7/06
See application file for complete search history.

(56) References Cited

U.S. PATENT DOCUMENTS 1,562,993 A * 11/1925 Stanwood .............. G05G 1/483
74/563

1,584,659 A * 5/1926 Schacht ................. G05G 1/483
15/265

6,622,592 B2   9/2003 Lee

FOREIGN PATENT DOCUMENTS

| FR | 2158632 A5 | 6/1973 |
| GB | 170742 A | 11/1921 |
| JP | S5063628 A | 5/1975 |

* cited by examiner

*Primary Examiner* — Thomas C Diaz
(74) *Attorney, Agent, or Firm* — Louise S. Heim

(57) ABSTRACT

A safety cover for an automotive brake pedal includes a base member configured to overlay the upper surface of a brake pedal having a first lateral brake pedal edge facing a gas pedal, a second lateral brake pedal edge opposite the first lateral brake pedal edge, a first longitudinal brake pedal edge facing a driver's seat, and a second longitudinal brake pedal edge opposite the first longitudinal brake pedal edge. The base member has a first lateral cover outer edge, a second lateral cover outer edge, a first longitudinal cover outer edge, and a second longitudinal cover outer edge. When the cover is placed on the brake pedal, the first lateral cover outer edge is flush with the first lateral brake pedal edge, and the second lateral cover outer edge is disposed laterally outwardly of the second lateral brake pedal edge. The second longitudinal cover outer edge is flush with the second longitudinal brake pedal edge, and the first longitudinal cover outer edge is disposed longitudinally outwardly of the first longitudinal brake pedal edge.

7 Claims, 2 Drawing Sheets

SAFETY COVER FOR AUTOMOTIVE BRAKE PEDAL

TECHNICAL FIELD

The present disclosure relates in general to automotive accessories and more particularly to a safety cover for a brake pedal.

BACKGROUND

As the average human life span increases, and advances in medicine allow people to remain healthy and active well into their eighties and beyond, the number of senior citizen drivers has also increased. While most of these seniors drive safely and responsibly, there is no denying that their reflexes are slower than they used to be. In addition, many older drivers lose feeling in their feet, which makes it difficult to move between the gas pedal and the brake pedal, or to distinguish between the two. In some instances, older drivers have been known to miss the brake pedal entirely, or to have their foot slip off the pedal without their knowledge.

Various efforts have been made in the past to design non-slip brake covers. For instance, French patent 2158632 A5 to LeCointre discloses a non-slip block or wedge of semi-flexible material that is secured to the top of a brake pedal by a sliding fit or clamps. U.S. Pat. No. 6,622,592 B2 to Lee discloses a rubber pad that is clamped between the top of a brake or accelerator pedal and a plastic holding cap. The rubber pad includes a plurality of anti-slip protrusions that project through slots in the holding cap to present a roughened contact surface for the driver's foot. British patent GB 170,742 to Maggs discloses a brake pedal cover comprising a plate of sheet metal or other suitable material that is about twice the length of the width of the brake pedal. The plate is curved in cross section to fit over the brake pedal. One end of the plate is turned under to engage with the underside of the foot plate, while the opposite end is flanged upwardly to form a lateral rest preventing the foot from sliding off the plate. None of these prior art brake covers have been entirely satisfactory, however. The brake covers of LeCointre and Lee both provide non-slip surfaces, but do not appreciably increase the surface area of the brake pedal, and therefore are still easily missed by a handicapped or elderly person having limited mobility of the foot. The cover of Maggs increases the effective width, but not the effective length, of the brake pedal, and requires a rather cumbersome and impractical clamping plate to secure the cover to the pedal.

These and other problems are addressed by this disclosure as summarized below.

SUMMARY

A safety cover for an automotive brake pedal includes a base member configured to overlay the upper surface of a brake pedal having a first lateral brake pedal edge facing a gas pedal, a second lateral brake pedal edge opposite the first lateral brake pedal edge, a first longitudinal brake pedal edge facing a driver's seat, and a second longitudinal brake pedal edge opposite the first longitudinal brake pedal edge. The base member has a first lateral cover outer edge, a second lateral cover outer edge, a first longitudinal cover outer edge, and a second longitudinal cover outer edge. When the cover is placed on the brake pedal, the first lateral cover outer edge is flush with the first lateral brake pedal edge, and the second lateral cover outer edge is disposed laterally outwardly of the second lateral brake pedal edge. The second longitudinal cover outer edge is flush with the second longitudinal brake pedal edge, and the first longitudinal cover outer edge is disposed longitudinally outwardly of the first longitudinal brake pedal edge.

The distance between the first and second lateral cover outer edges, also known as the width of the cover, is greater than the distance between the first and second lateral brake pedal edges, also known as the width of the brake pedal. Similarly, the distance between the first and second longitudinal cover outer edges, also known as the depth of the cover, is greater than the distance between the first and second longitudinal brake pedal edges, also known as the depth of the brake pedal. Thus, the cover increases the amount of surface area available for supporting the driver's foot. A side flange provided along the second lateral cover edge prevents the driver's foot from sliding off cover when moving away from the gas pedal.

In one aspect of the disclosure, the cover includes a front flange that extends downwardly from the first longitudinal cover outer edge and prevents the drivers foot from getting lodged under the brake pedal.

In another aspect of the disclosure, the cover includes a fastening assembly for securing the cover to the brake pedal. The fastening assembly includes a longitudinally extending support member that extends below the brake pedal in a longitudinally inward direction, and a laterally extending support member that extends below the brake pedal in a laterally inward direction. The longitudinally support member is fixed to a lower portion of the side flange, and the laterally extending support member is fixed to an inner surface of the front flange.

In yet another aspect of the disclosure, the base member of the cover is textured to minimize slippage of the driver's foot. The base member is configured as a grid comprising a plurality of laterally and longitudinally extending bars, with cut-out portions provided between the bars to provide texture.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
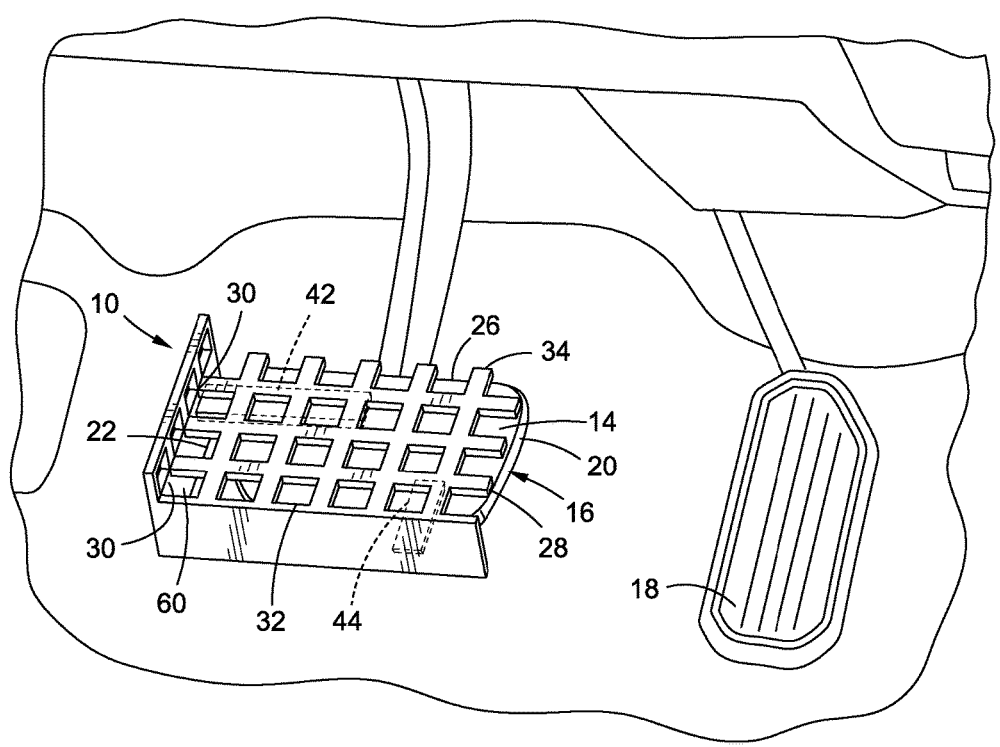
FIG. 1 is a perspective view showing a brake cover according to the present invention, in place on a brake pedal in the front driver's side portion of an automobile.

FIG. 1 shows a brake pedal cover according to the present disclosure, indicated in its entirety by the numeral 10, positioned on the upper surface 14 of a brake pedal 16 in the front driver's side interior of an automotive vehicle. A gas pedal 18 is located to the right of the brake pedal 16. For the purposes of this disclosure, components of the brake pedal 16 and cover 10 are described in terms of their location relative to the gas pedal 18 and the driver's seat, which is not shown, but would be located to the bottom of the figure. Also, the terms "inward and outward" are used to describe directions relative to the center of the brake pedal; ie. "inward" means toward the center of the brake pedal, and "outward" means away from the center of the brake pedal.

Figure 2:
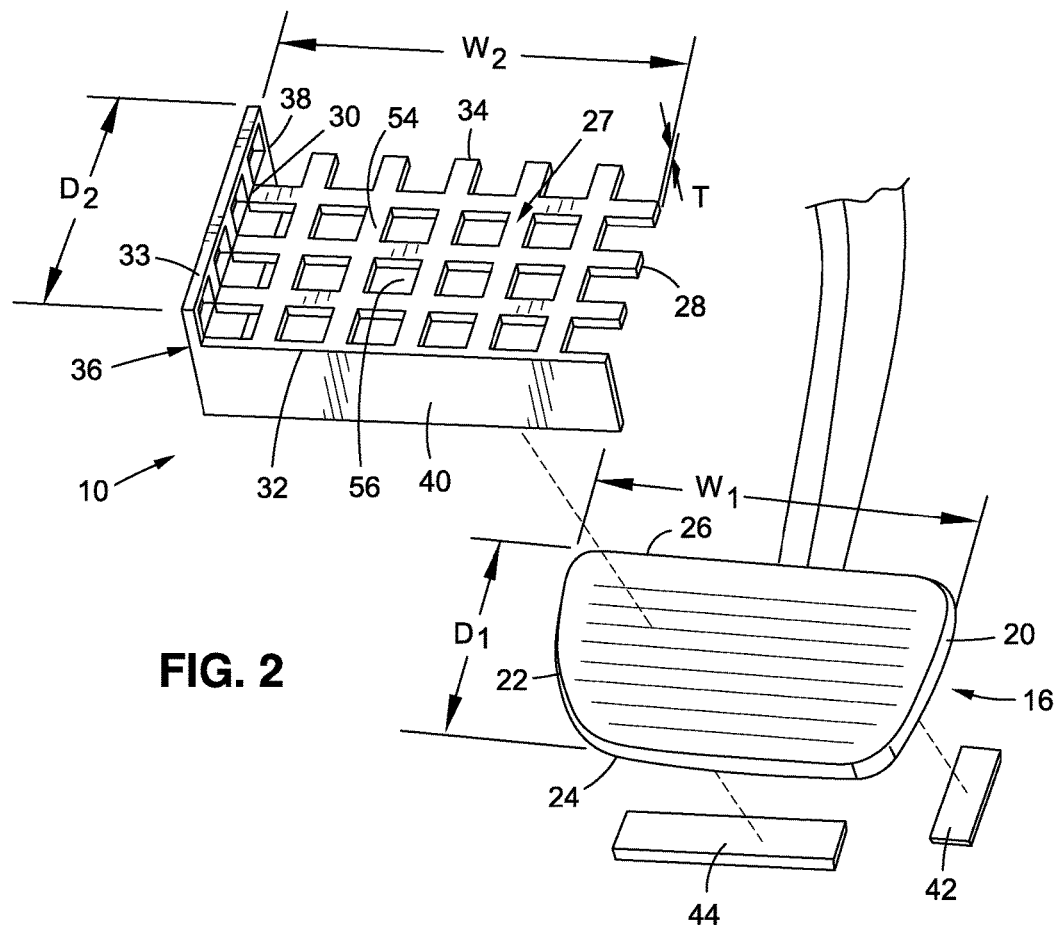
FIG. 2 is a perspective view showing the brake cover of FIG. 1 in exploded relationship to the brake pedal.

As best seen in FIG. 2, the brake pedal 16 includes a first lateral brake pedal edge 20 that faces the gas pedal 18, a second lateral brake pedal edge 22 that faces away from the gas pedal 18, a first longitudinal brake pedal edge 24 that faces the driver's seat, and a second longitudinal brake pedal edge 26 that faces away from the driver's seat. The width $W_1$ of the brake pedal 16 is defined as the distance between the first and second lateral brake pedal edges 20, 22 at the widest portion of the brake pedal 16, and the depth $D_1$ of the brake pedal 16 is defined as the distance between the first and second longitudinal brake pedal edges 24, 26.

The brake pedal cover 10 includes a base member 27 having a thickness T. The base member 27 includes a first lateral cover outer edge 28, a second lateral cover outer edge 30, a first longitudinal cover outer edge 32, and a second longitudinal cover outer edge 34. The width $W_2$ of the brake pedal cover 10, defined as the distance between the first and second lateral cover outer edges 28, 30, is greater than the width $W_1$ of the brake pedal 16 by an amount that is greater than the thickness T of the base member 27. The depth $D_2$ of the brake pedal cover 10, defined as the distance between the first and second longitudinal cover outer edges 32, 34, is greater than the depth $D_1$ of the brake pedal cover 10.

The second lateral cover outer edge 30 is coupled to a side flange 36 having an upper end 38 that extends upwardly from the base member 27 and functions as a wall preventing the driver's foot from sliding laterally off the cover 10 in the direction away from the gas pedal 18. The first longitudinal cover outer edge 32 is coupled to a front flange 40 that extends downwardly from the base member 27 and prevents the drivers foot from accidentally becoming lodged beneath the brake pedal 16.

Figure 3:
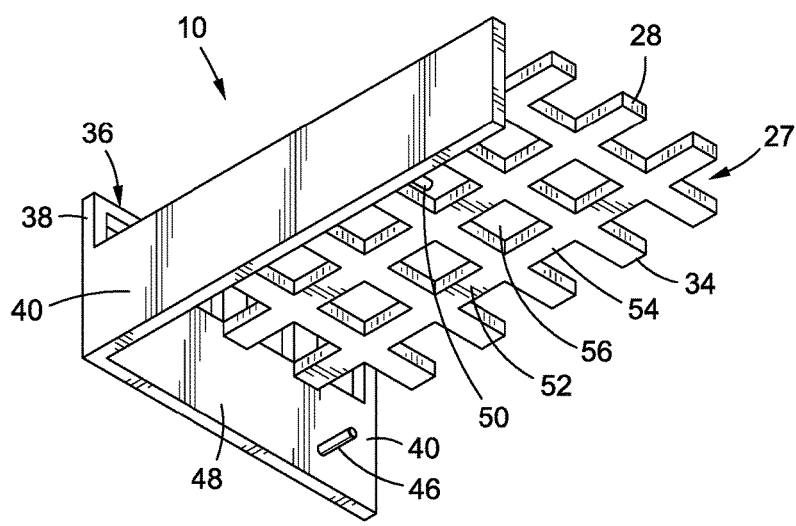
FIG. 3 is a perspective view taken from below of the brake cover of FIGS. 1 and 2.

The brake pedal cover 10 may be secured to the brake pedal 16 in various ways depending on the geometry of the brake pedal and other factors, but in the illustrated embodiment, a fastening assembly comprises a laterally extending support member 42 and a longitudinally extending support member 44 (both shown in phantom in FIG. 1). The laterally extending support member 42 is coupled to a first pin 46 extending laterally inwardly from a lower portion 48 of the slide flange 36 (as seen in FIG. 3), and the longitudinally extending support member 44 is coupled to a second pin 50 extending longitudinally inwardly from the front flange 40. The distance between each of the first and second pins 46, 50 and the bottom surface 52 of the base member 27 approximately equals the thickness of the brake pedal 16, so that cover 10 is essentially clamped in place over the brake pedal 16. Bolts, screws, or other fasteners may also be used to hold the cover 10 in place more securely.

The base member 27 and the upper portion 38 of the side wall 36 are textured to prevent the driver's foot from slipping off the cover 10. The texture may be provided by structuring the base member and upper portion 38 of the side wall 36 as grids comprising laterally and longitudinally extending bars 54, with cut-out portions 56 between adjacent bars 54.

When the cover 10 is properly secured to the brake pedal 16, the first lateral cover outer edge 28 is flush with the first lateral brake pedal edge 20, and the second lateral cover outer edge 30 is located laterally outwardly of the second lateral brake pedal edge 20, thus defining a space 60 between second lateral cover outer edge 30 and the second lateral brake pedal edge 20. The second longitudinal cover outer edge 34 is flush with the second longitudinal brake pedal edge 26, and the first longitudinal cover outer edge 32 is located longitudinally outwardly of the first longitudinal brake pedal edge 24. This positioning of the cover 10 ensures that the driver's foot is optimally placed on the brake pedal 16, as far away from the gas pedal 16 and as close to the driver as practical.

The safety cover 10 of the present disclosure is not designed to be used in automotive vehicles having a clutch, since the safety cover 10 may interfere with operation of the clutch pedal.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automotive safety brake pedal assembly comprising:
    a brake pedal having an upper surface including
        a first lateral brake pedal edge facing a gas pedal,
        a second lateral brake pedal edge opposite the first lateral brake pedal edge,
        a first longitudinal brake pedal edge facing a driver's seat, and
        a second longitudinal brake pedal edge opposite the first longitudinal brake pedal edge;
    a safety cover including
        a base member having
            a first lateral cover outer edge flush with the first lateral brake pedal edge,
            a second lateral cover outer edge located laterally outwardly of the second lateral brake pedal edge, wherein a space is defined between the second lateral cover outer edge and the second lateral brake pedal edge,
            a first longitudinal cover outer edge located longitudinally outwardly of the first longitudinal brake pedal edge, and
            a second longitudinal cover outer edge flush with the second longitudinal brake pedal edge; and
        a fastening assembly configured to secure the safety cover to the brake pedal.

2. The automotive safety brake assembly according to claim 1, wherein:
    the second lateral brake pedal edge is separated from the first lateral brake pedal edge by a first distance;
    the second longitudinal brake pedal edge is separated from the first longitudinal brake pedal edge by a second distance;
    the second lateral cover outer edge is separated from the first lateral cover outer edge by a third distance greater than the first distance; and
    the second longitudinal cover outer edge is separated from the second longitudinal cover edge by a fourth distance greater than the second distance.

3. The safety cover according to claim 2, wherein:
    the base member has a thickness; and
    the third distance is greater than the first distance by an amount greater than the thickness of the base member.

4. The safety cover according to claim 1, further comprising a cantilevered front flange coupled to the first longitudinal cover outer edge and extending downwardly from the base member.

5. The safety cover according to claim 1, wherein the base member is textured to minimize slippage of the driver's foot.

6. The safety cover according to claim 5, wherein the base member is configured as a grid comprising a plurality of laterally and longitudinally extending bars with cut-out portions between the bars.

7. The safety cover according to claim 4, further comprising a side flange coupled to and located laterally outwardly of the second cover lateral edge, the side flange including an upper portion that extends upwardly from the base member and functions as a wall preventing a driver's foot from sliding laterally off the cover in the direction of the gas pedal.

\* \* \* \* \*